Figure 1:
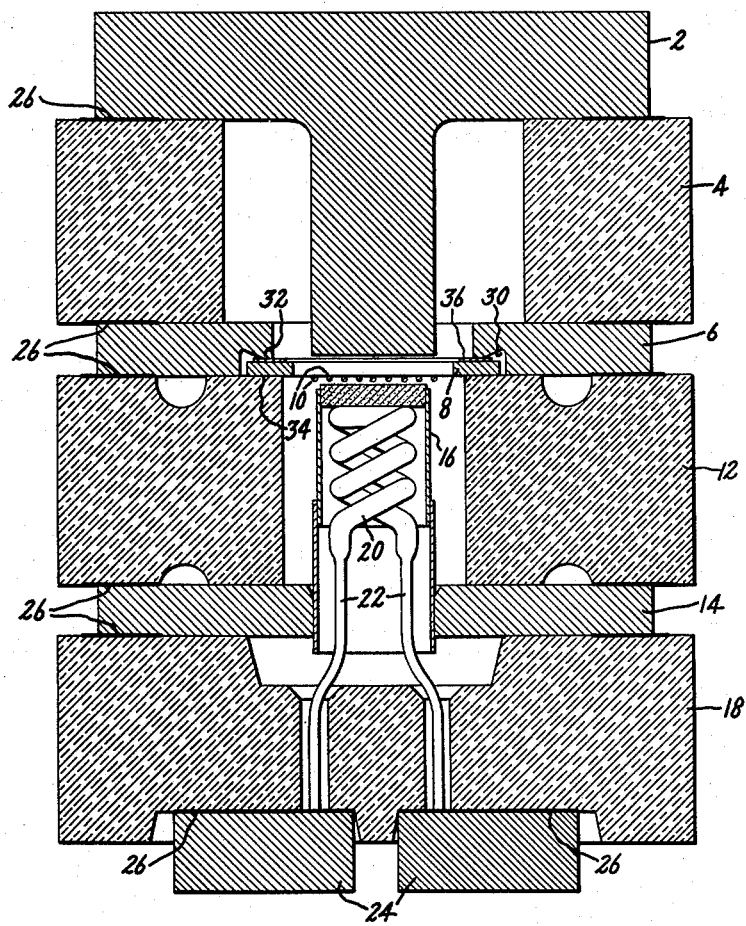

Feb. 2, 1960

C. G. CHILDS ET AL 2,923,847

GRID SHIM

Filed Sept. 27, 1956

INVENTORS:
JOSEPH M. CONNELLY,
CLAYTON G. CHILDS,

BY *Nathan J. Cornfeld*

THEIR ATTORNEY.

United States Patent Office 2,923,847
Patented Feb. 2, 1960

2,923,847

GRID SHIM

Clayton G. Childs and Joseph Michael Connelly, Owensboro, Ky., assignors to General Electric Company, a corporation of New York Application September 27, 1956, Serial No. 612,527

3 Claims. (Cl. 313—250)

This invention relates to improvements in electric discharge devices having in adjacent relation metallic parts whose thermal coefficients of expansion are different and whose adjacent surfaces may undesirably adhere or fuse together under elevated temperature conditions incurred during manufacture or use of the discharge device.

One advantageous form of electron discharge tube includes a stack of alternate ceramic and metal components of generally annular shape sealed together to form a generally cylindrical envelope. The ceramic components serve as insulating spacers, and the metal components serve as supports for, and connections or terminals to, the electrodes of the tube which are disposed within the envelope. In the manufacture of such tubes heat and pressure are conveniently used to facilitate joining the ceramic and metal parts in an operation which both outgases and seals the tube.

One difficulty in the construction of this type of tube arises from the fact that certain of the metal components of the envelope have thermal coefficients of expansion which generally differ substantially from the coefficient of expansion of other metals, such as tungsten, whose refractory and other mechanical and electrical properties makes them desirable to use within the tube as electrodes or supports for electrodes. Moreover in the arrangement of parts in such tubes, such an envelope member may not infrequently be disposed in contact with a refractory electrode. Under such circumstances the envelope member has a distinct tendency to adhere to or fuse with the electrode under the elevated temperature conditions encountered in tube manufacture or use, particularly where the envelope member may consist of one of the more chemically active metals such as titanium or other metal possessing gas gettering properties. The result of such adherence, in view of the difference in thermal coefficients of expansion of the two elements is that upon cooling of the parts their differential contraction produces undue stresses, and may cause distortion of the parts which, even though minute in an absolute sense, is highly objectionable from the standpoint of its effect on the preservation of critical dimensions within the tube.

Accordingly, a principal object of the present invention is to prevent the occurrence of the foregoing difficulties in electric discharge devices.

Another object is to provide an improved electron discharge tube of the alternate stacked ceramic and metal type which has increased tolerance to dissimilar thermal expansion of its metal parts without objectionable stressing or distortion thereof, and without objectionable effect on preservation of critical dimensions within the tube.

These and other objects of the invention will be apparent from the following description, and the scope of the invention will be defined in the appended claims.

Briefly, the foregoing difficulties are prevented in accordance with the invention herein described by interposing between the electrode or other refractory metal element and the other element which may have a tendency to adhere to the refractory metal, a separator of a material which resists adherence to or fusion with either the refractory element or the other metal element, and which provides bearing surfaces relative to which the refractory element and other metal element may undergo differential thermal expansion and contraction without objectionable stressing or distortion of either.

Figure 2:
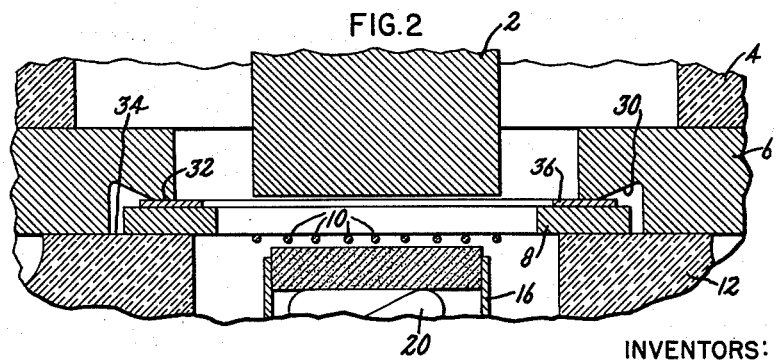

In the drawings, Fig. 1 is an axial sectional view of an electron discharge tube of a type to which the present invention is particularly applicable; and Figure 2 is an enlarged axial sectional view of a portion of the tube shown in Figure 1.

The tube shown in Fig. 1 includes an anode member and terminal 2, an annular grid insulator 4, a metal grid support and terminal ring 6, a grid electrode including a support washer 8 across which are strung a plurality of fine grid wires 10, a cathode insulator 12, a metal cathode support ring and terminal 14, a cathode 16, and a heater insulator 18. The cathode is provided with a heater 20 from which heater leads 22 extend through openings in the heater insulator 18 to heater terminals 24 in the bottom of the heater insulator. The grid wires 10 and the grid support washer 8 are made of tungsten or some other metal of refractory properties suitable to the environment. The grid insulator 4, cathode insulator 12, and heater insulator 18 are made of a suitable ceramic, for example forsterite, and the anode 2, grid ring 6, cathode ring 14, and heater terminal 24 are made of a metal having suitable gas gettering properties and a thermal coefficient of expansion compatible with that of the ceramic, such as for example titanium. All of the titanium parts are sealed to the ceramic parts by suitable seals 26 to form a vacuum tight envelope.

The bottom of the grid ring 6 has a recess 30 extending around its inner periphery and forming an annular surface 32 spaced from and facing the top of the cathode insulator. The grid support washer 8 is adapted to be clamped tightly between surface 32 and the opposing surface 34 of the cathode insulator so as to hold the grid rigidly in place both axially and transversely of the tube once the envelope is assembled and sealed.

In the manufacture of the tube the parts are assembled as shown in the drawing, axial pressure is applied to the parts, and the asesmbly is both evacuated and raised to an elevated temperature, in the range for example of 800°–1100° C., for a sufficient period to thoroughly outgas the parts, exhaust the envelope, and fuse the seals 26. Since the thermal coefficient of expansion of titanium is approximately three times as great as that of, for example, tungsten, the grid ring 6 radially expands a correspondingly larger amount than the grid support washer 8. Moreover, due to the chemically active nature of titanium and its tendency to adhere to or fuse with other metals with which it is in contact at elevated temperatures in the range above-mentioned, the surface 32 of the grid ring has a pronounced tendency to become joined to the opposing surface of the grid support washer 8 with which it is in contact. In such event, as the assembly is allowed to cool the radial contraction of the grid ring 6 is some three times as great as the grid support washer 8, and since relative movement between the grid ring and grid support washer is prevented by the adherence of surface 32, the grid support washer will be radially compressed. This may distort the grid support washer out of shape or cause slackening and sagging of the grid wires 10, which is of course highly objectionable.

In accordance with the present invention such distortion of the grid support washer 8 or slackening of the wires 10 is prevented in the tube embodiment shown by inserting between the opposing surfaces of the grid ring 6 and grid support washer 8 a separator or shim 36 of a material which has an inhibition to, or is not suceptible to, adhering to or fusing with either the grid support washer or the grid ring in the temperature range to which the parts are subject during manufacture or later operation of the tube. The shim 36 thus provides smooth bearing surfaces along which relative movement between the gas gettering metal grid ring 6 and refractory support washer 8 may take place, and with respect to which the grid ring and support washer may undergo differential thermal expansion and contraction without objectionably stressing or distorting either part, thereby precluding compression of the grid support washer such as to slacken the wires 10.

Preferably the material of which the shim is made should resist adhesion to both grid ring 8 and support washer 6. However, any suitable material may be employed for the shim so long as it does not adhere to at least one or the other of the grid support washer or grid ring in the temperature range to which the assembly is subjected during manufacture or subsequent operation of the tube. Such metals as, for example, tantalum and molybdenum have been found to give satisfactory results as shims between tungsten and titanium, molybdenum being somewhat preferable from a manufacturing standpoint because of the ease with which parts may be punched from thin sheet stock of this metal. The shim need not be metallic, however, but may if desired be of any suitable material, such as for example, a ceramic wafer, capable of resisting adhesion as above described and enabling the necessary relative movement involved in the differential expansion and contraction of the parts it separates. In the event a shim of electrically non-conductive material is employed in the embodiment of the invention shown in the drawing, however, an alternate electrically conducting path must be provided between the grid support washer and the grid ring serving as its external electrical terminal.

Thus it may be seen that the present invention provides a means for positively preventing sticking or adherence of parts of an electron discharge device which have a tendency to adhere and whose differential thermal expansion and contraction is such as to cause objectionable stress and possible distortion of either during manufacture or operation of the discharge device. The separating shim provided in accordance with the present invention is negligible in cost, involves a minimum change in the shape or dimensions of the associated parts, and may be readily inserted in the assemblage of parts during manufacture.

It will be appreciated by those skilled in the art that the invention may be carried out in various ways and may take various forms and embodiments other than those illustrative embodiments heretofore described. It is to be understood that the scope of the invention is not limited by the details of the foregoing description, but will be defined in the following claims.

What we claim as new and desire to secure by Letters Patent of the United States is:

1. In an electron discharge device adapted to be subjected to elevated temperatures in the range of 800° C. to 1100° C. during manufacture or operation, a first metal member constituted at least in part of a refractory metal, a second metal member constituted at least in part of titanium having a tendency to fuse to said first metal member at said elevated temperatures, and a separator shim disposed between and in contact with said first and second metal members and providing at least one bearing surface relative to which said first and second metal members may undergo differential thermal expansion and contraction, said separator shim comprising a metal from the group consisting of tantalum and molybdenum having a resistance to adhering to at least one of said first and second metal members at temperatures equal to and below said elevated temperatures.

2. In an electron discharge device adapted to be subjected to elevated temperatures in the range of 800° C. to 1100° C. during manufacture or operation, a first metal member constituted at least in part of a refractory metal, a second metal member constituted at least in part of a gas gettering metal having a tendency to fuse to said first metal member at said elevated temperatures, and a separator shim disposed between and in contact with said first and second metal members and providing at least one bearing surface relative to which said first and second metal members may undergo differential thermal expansion and contraction, said separator shim comprising a metal from the group consisting of tantalum and molybdenum having a resistance to adhering to at least one of said first and second metal members at temperatures equal to and below said elevated temperatures.

3. An electron discharge tube comprising an annular metallic electrode terminal of gas gettering metal constituted at least in part of titanium and sandwiched between a pair of annular ceramic insulators and adapted to be sealed thereto, said electrode terminal having a recess extending around its inner periphery and defining a clamping surface spaced from and confronting one of said insulators, an electrode having a portion received in said recess and adapted to be clamped between said clamping surface and said one insulator, said electrode portion comprising a refractory metal having a thermal coefficient of expansion different from the coefficient of expansion of said gas gettering metal, and a shim between said portion of said electrode and said clamping surface, said shim comprising a metal from the group consisting of tantalum and molybdenum and providing at least one bearing surface relative to which said electrode terminal and said electrode may undergo differential thermal expansion and contraction without mutual distortion.

References Cited in the file of this patent
UNITED STATES PATENTS

| | | |
|---|---|---|
| 2,527,792 | Beuhler | Oct. 31, 1950 |
| 2,604,229 | Schwartz | July 22, 1952 |
| 2,720,997 | Dailey et al. | Oct. 18, 1955 |
| 2,803,782 | Diemer | Aug. 20, 1957 |

OTHER REFERENCES

Kohl: "Materials Technology for Vacuum Tubes," Reinhold Pub. Corp., 1951, pages 419–420.